W. ROPER.
METALLIC SASH.
APPLICATION FILED OCT. 11, 1917.

1,259,778.

Patented Mar. 19, 1918.
3 SHEETS—SHEET 1.

Witnesses,
E. E. Reichart.
M. A. Inglar.

Inventor
William Roper
By Joshua R. H. Potts
his Attorney

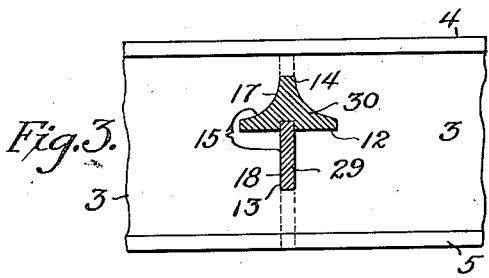
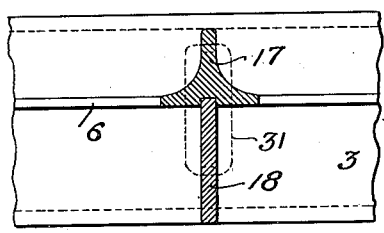
Fig. 3.  Fig. 4.
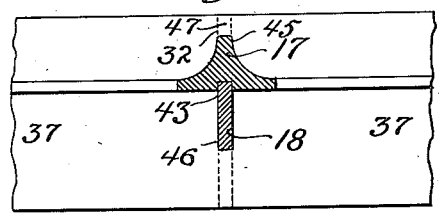
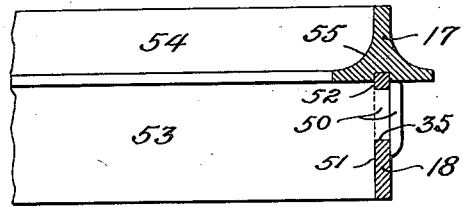
Fig. 5.  Fig. 6.
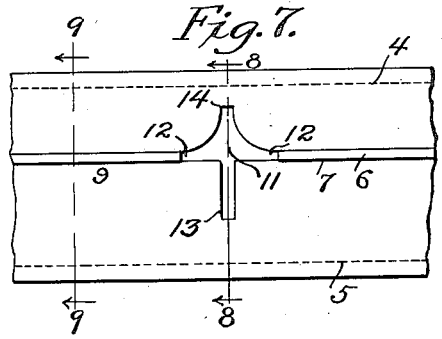
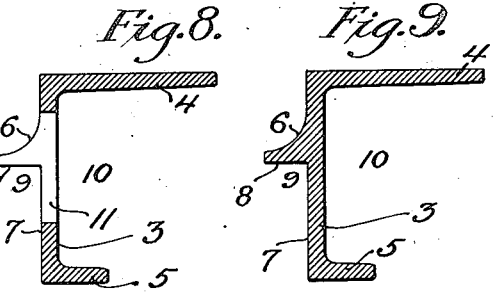
Fig. 7.  Fig. 8.  Fig. 9.
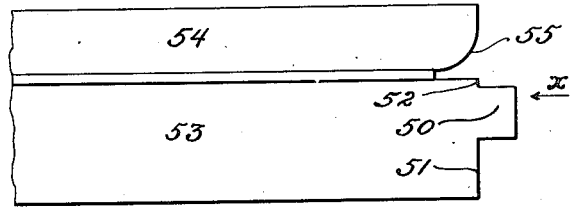
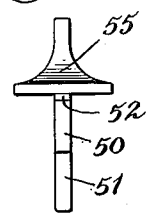
Fig. 10.  Fig. 11.

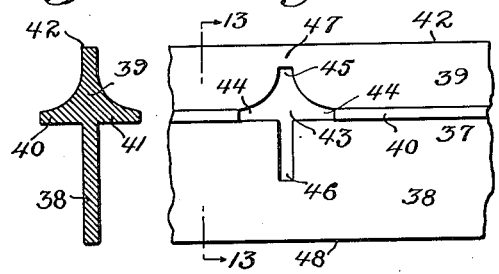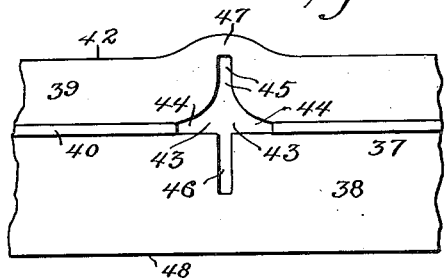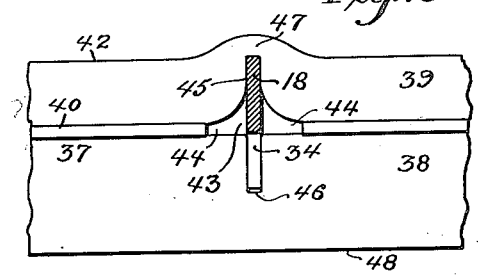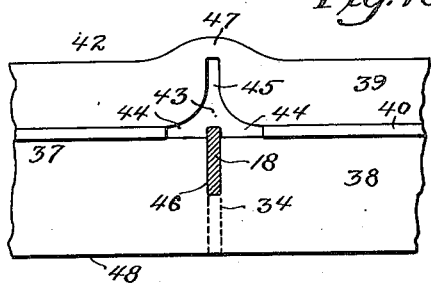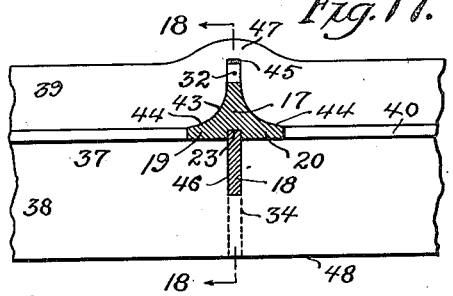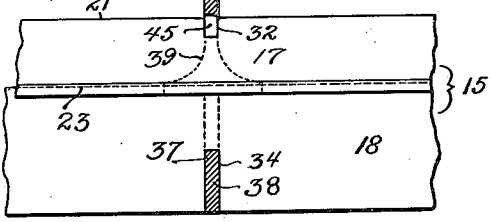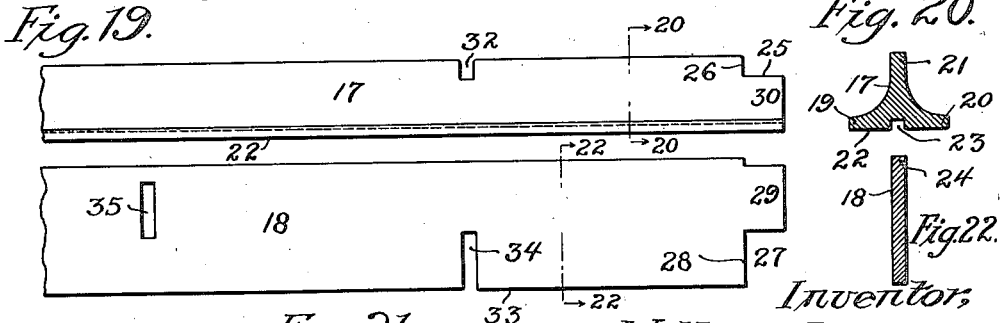

UNITED STATES PATENT OFFICE.

WILLIAM ROPER, OF PHILADELPHIA, PENNSYLVANIA, ASSIGNOR OF ONE-HALF TO A. L. WURSTER, OF HADDON HEIGHTS, NEW JERSEY.

METALLIC SASH.

1,259,778.     Specification of Letters Patent.     Patented Mar. 19, 1918.

Application filed October 11, 1917. Serial No. 195,879.

*To all whom it may concern:*

Be it known that I, WILLIAM ROPER, a subject of the King of Great Britain, residing at Philadelphia, in the county of Philadelphia and State of Pennsylvania, have invented certain new and useful Improvements in Metallic Sashes, of which the following is a specification.

One object of my invention is to provide a metallic sash for windows, transoms, doors, etc., which will be strong and durable and which can be quickly and easily manufactured.

Another object is to so construct my improved sash that it will be particularly adapted for use in large windows or other orifices and so that it can be easily connected to a supporting structure.

A further object is to so construct my invention that all of the parts can be cheaply produced and assembled.

These objects, and other advantageous ends which will be described hereinafter, I attain in the following manner, reference being had to the accompanying drawings in which—

Figure 1:
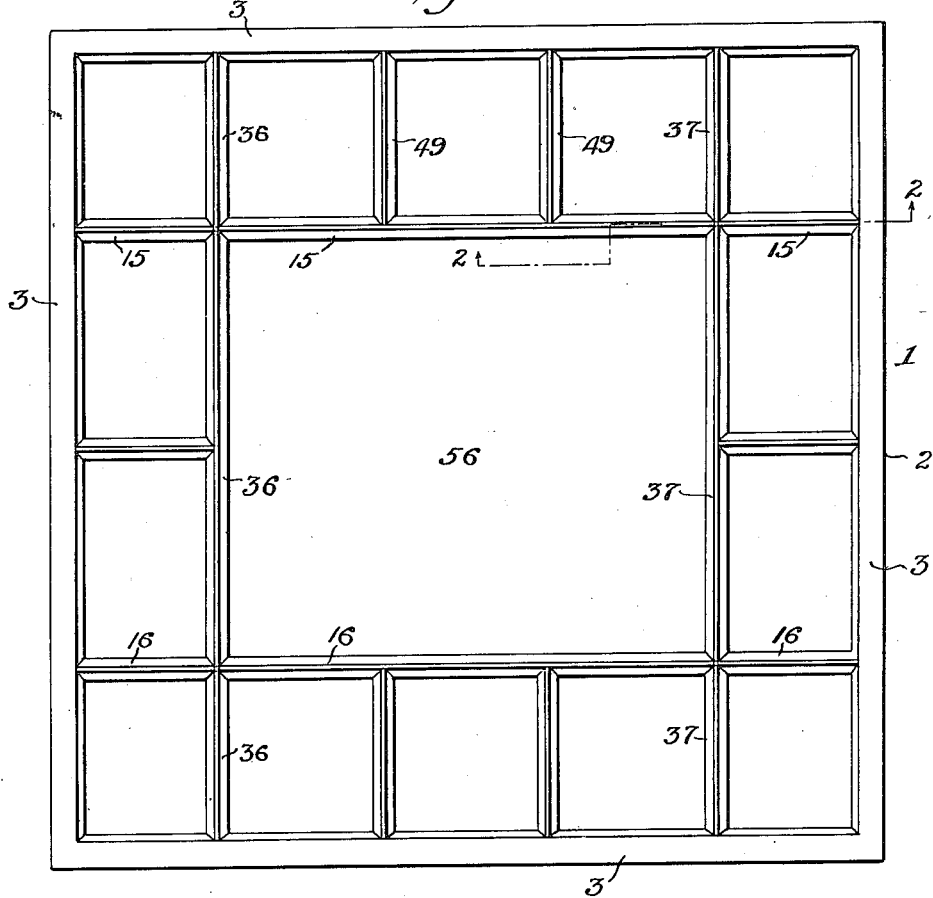
Figure 2:
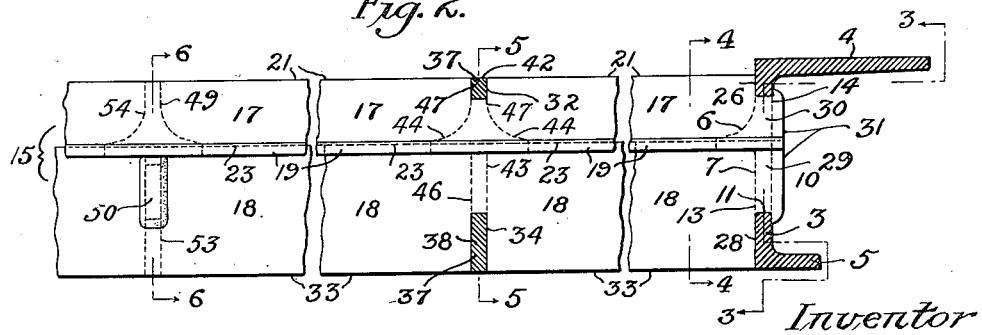

Figure 1 is a front elevation of a sash made in accordance with my invention,

Fig. 2 is a fragmentary section taken on the line 2—2 of Fig. 1 and drawn on an enlarged scale, Fig. 3 is a section taken on the line 3—3 of Fig. 2, Fig. 4 is a section taken on the line 4—4 of Fig. 2, Fig. 5 is a section taken on the line 5—5 of Fig. 2, Fig. 6 is a section taken on the line 6—6 of Fig. 2, Fig. 7 is a fragmentary elevation of the outside jamb section showing how the same is punched to receive the end of a transversely extending muntin, Fig. 8 is a section taken on the line 8—8 of Fig. 7, Fig. 9 is a section taken on the line 9—9 of Fig. 7, Fig. 10 is an elevation of an end portion of one of the divisional muntins, Fig. 11 is an end view of the muntin shown in Fig. 10 and looking in the direction of the arrow $x$, Fig. 12 is a fragmentary elevation of one of the main upright muntins showing how the same is first cut by a punch to receive said main transversely extending muntin, Fig. 13 is a section taken on the line 13—13 of Fig. 12, Fig. 14 is a view of the muntin shown in Fig. 12 after the metal has been bent or distorted by the punch to increase the length of the opening.

Fig. 15 shows the same muntin, in the stage illustrated in Fig. 14, with a separate tail section of said transversely extending muntin inserted through the notched opening.

Fig. 16 is a view of similar nature to Fig. 15 showing said tail section moved into interlocking engagement with an integral tail flange of said upright muntin, Fig. 17 shows the elements as illustrated in Fig. 16 with a separate head or cap section of said transverse muntin inserted through the remaining portion of the notched opening of the upright muntin, Fig. 18 is a sectional view taken on the line 18—18 of Fig. 17, Fig. 19 is a fragmentary side elevation of the separate head or cap section of one of said transverse muntins, Fig. 20 is a section taken on the line 20—20 of Fig. 19, Fig. 21 is a fragmentary side elevation of the separate tail section of said latter transverse muntin, and Fig. 22 is a transverse section taken on the line 22—22 of Fig. 21.

Referring to the drawings, 1 represents a sash which is made in accordance with my invention and includes a main frame 2 which is made up of a jamb section 3 which extends around the four sides of the frame. This jamb section 3 includes a facing flange 4 and a rear flange 5, said facing flange and rear flange extending in substantially the same direction, as clearly shown in Figs. 8 and 9.

The jamb section 3 also has a rib 6 extending inwardly from the inner surface 7, the surface 8 of said rib 6 extending substantially at right angles to the surface 7, thereby providing an angle 9 for glazing. The flanges 4 and 5 of the jamb section 3 form convenient means for attaching the frame 2 to any supporting structure and they also provide a channel 10 which can be filled with cement or concrete if the sash is to be embedded within a wall, pavement, or the like.

The jamb section 3 has openings 11 punched therethrough, as clearly shown in Figs. 7 and 8. These openings extend entirely through the rib 6 and include laterally extending recesses 12 and notched extensions 13 and 14. Thus the openings 11 are substantially cross-shape, as shown in Fig. 7.

Two transversely extending muntins 15 and 16 are each made up of a separate cap or head section 17 and a separate tail section 18, as clearly shown in Figs. 19 to 22 inclusive. The head section 17 has two laterally extending flanges 19 and 20 and a centrally projecting rib 21. The face surface 22 of the head section 17 is grooved longitudinally, as shown at 23. This groove 23 is of a width sufficient to receive the upper edge portion 24 of the tail section 18, the latter being made of flat strip material in the present instance.

The opposite ends of the rib 21 of the head section 17 are cut away, as shown at 25 in Fig. 19, to provide at each end an abutting shoulder 26 for a purpose hereinafter described. In similar manner the opposite ends of the tail section are cut away, as shown at 27, to provide, at each end, a shoulder 28 and a tongue 29.

The muntins 15 and 16, with the respective edge portions 24 of the tail sections 18 fitting within the grooves 23, are joined to the opposite side portions of the jamb section 3 by inserting the tongues 29 and the extreme end portions 30 of the head sections 17 through the openings 11 which, as above described, are cut in the jamb section 3.

The lateral flanges 19 and 20 of the head sections 17 being of substantially the same width and shape as the laterally extending recesses 12, and snugly fit the latter, as clearly shown in Figs. 2, 3, and 4, and the tongues 29 of the tail sections 18 fit the notched extensions 13. The shoulders 26 and 28 of the head sections 17 and tail sections 18 respectively abut the inner surfaces 7 of the jamb section 3, as clearly shown in Fig. 2.

The extreme ends of the head sections 17 and tail sections 18 are upset or riveted over, as clearly shown at 31 in Figs. 2 and 4, sufficient material having been provided in the length of the portions which extend through said openings 11 to permit said upsetting or riveting to bind the muntins 15 and 16 to the jamb section 3.

The ribs 21 of the head sections 17 of the muntins 15 and 16 have notches 32 and the edges 33 of the tail sections 18 have notches 34. The tail sections 18 also have slots 35 spaced at points throughout their lengths for the attachment of divisional muntins, as will hereinafter be described.

Upright muntins 36 and 37 extend from the top to the bottom of the frame 2 and are each of the same construction in cross section, such for example as shown in Figs. 12 and 13. Each of these muntins 36 and 37 includes a tail flange 38 which is flat in the present instance and an integral head section 39. The head section 39 has lateral flanges 40 and 41 and a terminal rib 42.

In the process of manufacture of my improved sash I preferably punch the openings 43 in each of the muntins 36 and 37, said openings extending entirely through the lateral flanges 40 and 41 and through the tail flange 38 and terminal rib 42. These openings 43 as initially cut or notched include laterally extending recesses 44 and notched extensions 45 and 46. The notched extension 45 is formed in the head section 39 and the notched extension 46 is formed within the tail flange 38.

After these openings 43 are punched out the portions 47 of the metal are distorted from the position shown in Fig. 12 to the position shown in Fig. 14 to temporarily lengthen or increase the distance between the notched extensions 45 and 46. This increased length of the openings 43 is sufficient to permit the tail sections 18 to be slid therethrough in the manner illustrated in Fig. 15, it being, of course, understood that the muntins 15 and 16 are not riveted to the jamb section 3 until after the tail sections 18 have been inserted through openings 43 nor until after certain other steps in the assembling of the muntins takes place, as hereinafter to be described. After the tail sections 18 of the muntins 15 and 16 have been inserted through the openings 43 and moved transversely therethrough until the notches 34 register with the tail flanges 38, they are allowed to drop into the position shown in Fig. 16 so as to interlock with the tail flanges 38, it being noted that the provision of the notches 34 permits the tail sections 18 to straddle the portions of the tail flanges 38 which are located between the ends of the notched extensions 46 and the extreme outer edges 48 of the tail flanges.

In like manner the notched extensions 46 of the openings 43 permit the tail flanges at portions adjacent the head sections 39 to straddle or embrace the portions of the tail sections 18 existent between the inner ends of the notches 34 and the edge portions 24 of said tail sections 18. Thus a complete interlock is attained between the tail sections 18 and the tail flanges 38 of the upright muntins 36 and 37.

After the tail sections 18 are thus inserted and joined as just described the head sections 17 are slid endwise through the remaining portions of the openings 43 which are not occupied by the tail sections 18, the notched extensions 44 permitting the lateral flanges 19 and 20 to slide therethrough.

The ribs 21 of the head sections 17 can freely pass through the temporarily lengthened notched extensions 45 of the openings 43, as clearly shown in Figs. 17 and 18. The head sections 17 are moved longitudinally until the notches 32 are in alinement with the distorted portions 47 of the head sections 39, as clearly shown in Fig. 18. When the parts are in this position the distorted portions 47 of the head sections 39 can be hammered or otherwise forced within the respective notches 32, thus locking the muntins 15 and 16 to the muntins 36 and 37 and also locking the head sections 17 to the tail sections 18.

Divisional muntins 49 are provided to both strengthen the sash and also to permit divisional glazing, and I have illustrated in detail in Figs. 10 and 11 an enlarged elevation of the end portion of one of these divisional muntins, and in Figs. 2 and 6 I have illustrated how I secure these divisional muntins to other of the muntins. I provide the ends of the muntins 49 with tongues 50 and at the same time provide shoulders 51 and 52 on the integral tail flange 53. The extreme ends of the integral head sections 54 are cut out as shown at 55 to abut the head sections 17 and to neatly intersect said head sections. I form the end 55 of substantially the same contour as one of the lateral flanges 19 or 20 of the head section which the divisional muntin joins.

The tongues 50 as illustrated in Figs. 2 and 6 pass through the slots 35 in the tail sections 13 and are upset or riveted thereto, as clearly shown in Fig. 2.

The central space 56 which is bounded by the upright muntins 36 and 37 and the transversely extending muntins 15 and 16 can be either glazed or used for the mounting of a transom (not illustrated).

Thus by the particular construction and manner of joining of the muntins I am able to produce a strong and durable sash in which the upright and transverse muntins are securely joined together and to the main frame.

While I have described and illustrated a frame of particular construction it will be noted that different arrangements of the muntins can be made since my invention consists chiefly of the manner in which two or more muntins are joined together and the particular arrangement of the joining elements.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A sash including two intersecting muntins, one of said muntins having an opening through which a portion of the other muntin extends, said latter mentioned muntin including two sections respectively producing the oppositely disposed longitudinally extending edge portions thereof and having notches adapted to embrace portions of said first mentioned muntin which are adjacent said opening, substantially as described.

2. A sash including two intersecting muntins, one of said muntins having an opening through which a portion of the other muntin extends, said latter mentioned muntin including two sections respectively producing the oppositely disposed longitudinally extending edge portions thereof and having notches adapted to embrace portions of said first mentioned muntin which are adjacent said opening, said latter portions being continuous with the length of said first mentioned muntin, substantially as described.

3. A sash including two intersecting muntins, one of said muntins having an opening through which a portion of the other muntin extends, said latter mentioned muntin including two sections respectively producing the oppositely disposed longitudinally extending edge portions thereof and having notches adapted to embrace portions of said first mentioned muntin which are adjacent said opening, said latter portions being continuous with the length of said first mentioned muntin, certain of said latter portions being temporarily distorted to permit the sections of said second muntin to be successively passed through said opening and to permit the portion of said second muntin adjacent the notches to embrace said portions of said first mentioned muntin, substantially as described.

4. A sash including two intersecting muntins, one of said muntins having an opening through which a portion of the other muntin extends, said latter mentioned muntin including two sections respectively producing the oppositely disposed longitudinally extending edge portions thereof and having notches adapted to embrace portions of said first mentioned muntin which are adjacent said opening, said latter portions being continuous with the length of said first mentioned muntin, certain of said latter portions being temporarily distorted to permit the sections of said second muntin to be successively passed through said opening and to permit the portion of said second muntin adjacent the notches to embrace said portions of said first mentioned muntin, one of said sections of said second mentioned muntin having a groove therein in which the other section of said second muntin slidably fits, substantially as described.

5. A sash including a jamb section having an opening, a muntin intersecting said jamb section and including a plurality of longitudinally extending sections each having a portion extending through said opening and riveted at the opposite side of said section, a second muntin having an opening therein through which portions of said sections of the first mentioned muntin pass, said first mentioned muntin having notches in each of its sections to permit adjacent portions thereof to embrace continuous portions of said second mentioned muntin which are adjacent said opening, substantially as described.

6. A sash including a jamb section having an opening, a muntin intersecting said jamb section and including a plurality of longitudinally extending sections each having a portion extending through said opening and riveted at the opposite side of said section, a second muntin having an opening therein through which portions of said sections of the first mentioned muntin pass, said first mentioned muntin having notches in each of its sections to permit adjacent portions thereof to embrace continuous portions of said second mentioned muntin which are adjacent said opening, one of said sections of said first mentioned muntin having a longitudinally extending groove therein into which fits a longitudinally extending edge of the other of said sections of the first mentioned muntin, substantially as described.

7. A sash including a jamb section having an opening, a muntin intersecting said jamb section and including a plurality of longitudinally extending sections each having a portion extending through said opening and riveted at the opposite side of said section, a second muntin having an opening therein through which portions of said sections of the first mentioned muntin pass, said first mentioned muntin having notches in each of its sections to permit adjacent portions thereof to embrace continuous portions of said second mentioned muntin which are adjacent said opening, one of said sections of the first mentioned muntin having a slot therein, and a third muntin having an end portion adapted to abut said first mentioned muntin and a tongue passing through said slot and riveted on its extreme outer end to said first mentioned muntin, substantially as described.

8. A sash including a jamb section having an opening, a muntin intersecting said jamb section and including a plurality of longitudinally extending sections each having a portion extending through said opening and riveted at the opposite side of said section, a second muntin having an opening therein through which portions of said sections of the first mentioned muntin pass, said first mentioned muntin having notches in each of its sections to permit adjacent portions thereof to embrace continuous portions of said second mentioned muntin which are adjacent said opening, one of said sections of the first mentioned muntin having a slot therein, and a third muntin having an end portion adapted to abut said first mentioned muntin and a tongue passing through said slot and riveted on its extreme outer end to said first mentioned muntin, one of the sections of said first muntin having a longitudinally extending groove therein into which a longitudinally extending edge of the other of said sections fits, substantially as described.

In testimony whereof I have signed my name to this specification in the presence of two subscribing witnesses.

WILLIAM ROPER.

Witnesses:
 Mary A. Inglar,
 Chas. E. Potts.